AMPLIFIER USING ANTENNA AS A CIRCUIT ELEMENT

Filed Feb. 11, 1965 2 Sheets-Sheet 1

INVENTOR
John R. Copeland
William J. Robertson
BY
Anthony D. Cennamo

AMPLIFIER USING ANTENNA AS A CIRCUIT ELEMENT

Filed Feb. 11, 1965 2 Sheets-Sheet 2

INVENTOR.
John R. Copeland
William J. Robertson
BY
Anthony D. Cennamo

United States Patent Office 3,386,033
Patented May 28, 1968

3,386,033
AMPLIFIER USING ANTENNA AS A CIRCUIT ELEMENT

John R. Copeland and William J. Robertson, Columbus, Ohio, assignors to The Ohio State University Research Foundation Filed Feb. 11, 1965, Ser. No. 431,892
12 Claims. (Cl. 325—373)

This invention relates in general to method and means of unifying electronic components and in particular to a novel manner of combining the functional electronic components operable from a source of high frequency signal voltage.

The compactness required by commercial electronics is making mandatory the utmost economy of space in packaging of electronic components. This compactness must not be a sacrifice on its operability and must maintain the highest possible operating efficiencies. Similarly, compactness of design as a manufacturing cost factor and improved operation is always of importance in the developments of commercial electronic products.

Until recently the electronic components, such as vacuum tubes, capacitors and other circuitry, were bulky and cumbersome. Despite every effort for neatness and efficiency, conventional items, such as electronic receivers and transmitters, maintained large space requirements. In addition to a loss of space, these bulky components used in the conventional receivers and transmitters lowered considerably the efficiency of the operation of the system. Further, when electronic systems in higher frequency ranges are considered, efficiency requirements become even more stringent and consequently the inefficiency of the conventional components increased.

In the last decade or so, there has been a continual development of parameters leading toward effective miniaturization. The most important being the printed circuit and, more recently the semi-conductors, such as the transistor. These elements not only permit miniaturization but are inexpensive, small, simple, long-lasting, and more reliable than even the most expensive prior used components.

Despite these developments in the components, per se, there continues to be the lack of unification. This is especially apparent where the actual transmitting or receiving apparatus is remoted from the antenna. Generally, even though a neat package of minature components may be assembled, and even in the "solid state circuits," the transmission of the signals in the conventional manner from one circuit to the next tends to defeat the intended result. The problem, of course, becomes more severe as the operating frequency is increased.

In the co-pending application, Ser. No. 34,095, now Patent No. 3,296,536, filed June 6, 1960, for "Antenna System" a converter circuit is incorporated directly in the tip, or at the point of signal origin, of the antenna. With that arrangement, there is provided an antenna system that is broad banded, has instant frequency conversion, and high signal-to-noise ratio, together with other physical advantages.

In the present invention there is employed the concept of integrating the design of an antenna with the circuitry with which it is intended to function. This combination is capable of providing improved system performance from fewer components in more compact form than the more conventional approach of separate design. In a truly integrated design, the antenna structure performs one or more circuit functions, as well as its antenna function, and as a result, there is no sharp division which isolates the antenna terminals from the circuit terminals.

This duplication of functions in the antenna provides for the elimination of the usual matching and tuning elements between an antenna and its circuitry. Further, the electrical combination makes it convenient to incorporate some portions of the circuitry directly in the antenna structure, dispensing with transmission lines. As a result of the elimination of these circuit elements, RF losses are reduced and, in receiving applications, the operating noise temperature of the system is lowered.

The concept of integrated design has found utility in transmitting, receiving, and echo-area control.

More specifically, a preferred embodiment of the present invention comprises a novel integrated design uniting a resonant half-wave dipole antenna with a transistor amplifier thereby providing a simple, stable, compact, high-gain, low-noise, and inexpensive structure. The resonant dipole antenna is matched directly into the transistor amplifier, eliminating the usual transmission lines and auxiliary tuned circuits. The result is a maximum bandwidth device, with high gain and better noise performance than is possible in conventional operation using the same components separately.

Accordingly, it is a principal object of the present invention to provide a new and improved integrated and unified antenna system.

Another object of the present invention is to provide an integrated and unified antenna system that is simple, stable, compact, relatively inexpensive and with an efficiency not obtainable through conventional techniques and packaging.

A further object of the present invention is to provide an antenna system and radio frequency amplifier that has an extremely low noise potential and with high gain.

Still another object of the present invention is to integrate a radio frequency amplifier system using the newly developed electronic components in an antenna system that permits their maximum efficiency without attendant losses normally encountered with conventional components.

Other objects and features of the invention will become apparent from a reading of the following description together with the drawings in which.

Figure 1:
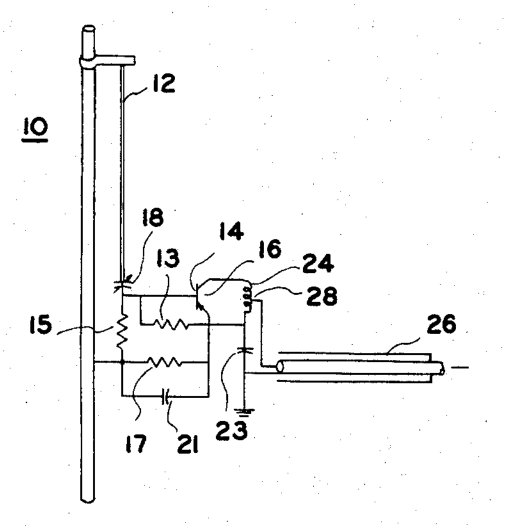
FIGURE 1 is a preferred embodiment of the integrated amplifier-antenna of the present invention.
Figure 2:
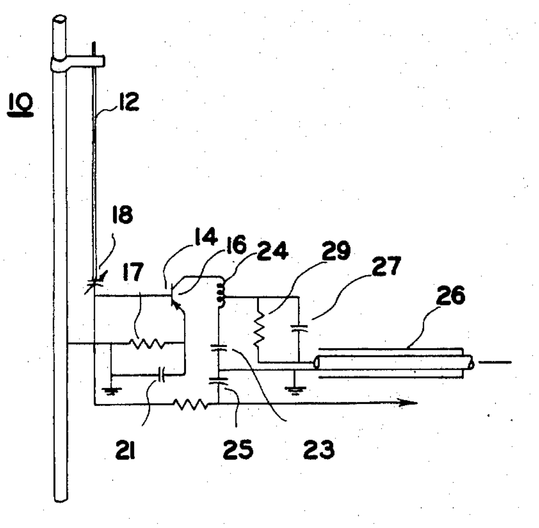
FIGURE 2 is the antenna-amplifier of FIGURE 1 further incorporating an automatic gain circuit.

Referring now specifically to FIGURES 1 and 2 there is shown two schematic diagrams illustrating transistorized dipole antennas of the present invention. The transistor amplifier of FIGURE 1 is operated with fixed bias for maximum gain or minimum noise temperature. In the structure of FIGURE 2, an automatic gain control circuit is used to provide a variable gain for use where gain control is required.

The antenna, as shown in FIGURE 1, is a resonant half-wavelength dipole 10 with a gamma-match feed 12 connected directly to the base 14 of the transistor 16. The length of the gamma rod 12 and resonating capacitance 18 were both made adjustable for proper matching between the antenna 10 and the transistor 16.

The output circuit comprises a parallel resonant tank inductor 24 and the parasitic output capacitance of the transistor to achieve maximum bandwidth. The coaxial output was tapped at 28 part-way up from the cold end of this tank circuit for an impedance match. Other tap points could be used depending on whether greater or less bandwidth were desired in the output circuit at the expense of power gain.

In addition to the integrated feature, the antenna of FIGURE 1 operates conventionally with fixed gain as described. Bias for the transistor base is fixed by resistors 13 and 15 in conjunction with the bypassed emitter resistor 17. The DC supply for the amplifier is located remotely and is connected through the same conductor which carries the amplified output signal from tap point 28. Capacitors 21 and 23 are RF bypass capacitors.

The amplifier of FIGURE 2 differs from the amplifier of FIGURE 1 by the type of base bias to provide a variable gain. The bias is conventional for variable-gain transistor amplifiers. The DC supply is remote and is connected to the tap point 28 through the dropping resistor 29. This resistor is bypassed for the signal frequency by bypass capacitor 27.

The gain control voltage is applied through resistor 19, and it functions by controlling the DC bias current through the transistor 16. The DC collector voltage is adjusted by the action of the bypassed dropping resistor 29 in the collector circuit.

This type of gain control is suitable for either manual gain control or automatic gain control depending only on the remainder of the circuitry with which the invention is used.

The $\lambda/4$ sleeve balun 26 shown in FIGURES 1 and 2 was required only to prevent antenna currents from flowing on the supporting structure of the dipole. This is a common fault of the gamma-match type of unbalanced feed arrangement, and if uncorrected, can lead to asymmetrical radiation patterns of the dipole.

Measurements have been made with the transistorized dipole antenna of FIGURE 1 with results of high gain with a low effective noise temperature. The bandwidth is approximately equal to that of the dipole antenna itself with no affect whatever on the radiation pattern of the dipole and gain, when optimized for the best noise performance.

The parameters of interest in the design of an antenna-amplifier are pattern, gain, and noise temperature. It has been shown that the patterns could be measured and interpreted in the same way as ordinary antenna patterns. The gain of an antenna-amplifier is interpreted as a function of both antenna gain and circuit gain, and in the present invention is measured in terms of gain over a half-wavelength reference dipole. Also in the present case, the circuit gain can be more or less separated from the antenna gain.

The noise temperature of the antenna-amplifier of the present invention was found to be more difficult to measure. In conventional receiving systems, a direct measurement of noise temperature with respect to input terminals can be made on a receiver, and the effective noise contribution due to losses in the antenna and matching circuits can be measured and added. However, this approach is inapplicable to the antenna-amplifier of the present invention generally, because no such set of input terminals to the receiver exists.

The other related parameter which can be measured is the field-strength sensitivity, defined as the power density of the electromagnetic wave in which the antenna-amplifier must be immersed in order to provide signal output equal to noise output:

$$FSS=|\overline{P}_{inc}|]S_{out}=N_{out}$$

where $\overline{P}_{inc}$ is the incident Poynting vector, $S_{out}$ is signal power output, $N_{out}$ is noise power output. This measurement is then repeated using a reference dipole and a receiver of known noise temperature. The resulting ratio of field strength sensitivities, along with the measured power gain of the antenna-amplifier and the effective antenna temperatures, is sufficient to determine the effective noise temperature of the antenna-amplifier:

$$T_a=T_e(FSSR-1)+T_r\frac{(FSSR-1)}{G}$$

where $T_a$=antenna-amplifier noise temperature
$T_e$=antenna noise temperature
$T_r$=noise temperature of the receiving system following the antenna-amplifier
$G$=gain of the antenna-amplifier
$FSSR$=field-strength sensitivity ratio.

Figure 3:
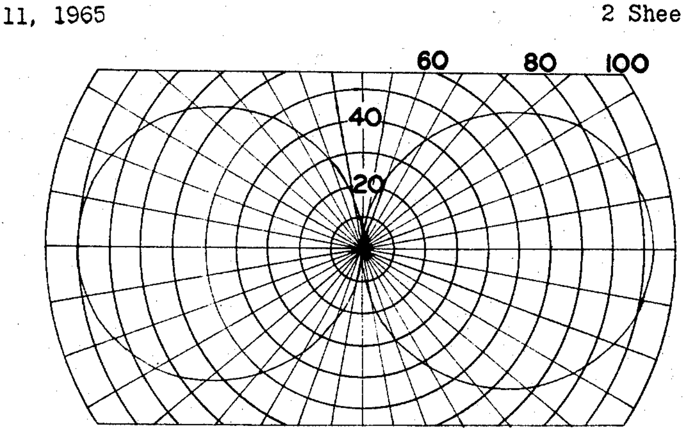
FIGURE 3 illustrates the field patterns of transistorized dipole antenna-amplifier and reference dipole antenna.

The gain of a constructed embodiment of the transistorized dipole antenna-amplifier was measured as 12.5 db relative to the reference dipole. The pattern was identical to the reference dipole pattern as shown in FIGURE 3. The 12.5 db gain difference was removed for better comparison of the two patterns. It was found that the controllable-gain antenna-amplifier of FIGURE 2 could be adjusted over the range from 20 db loss to 12.5 db gain by variation of the control voltage.

Figure 5:
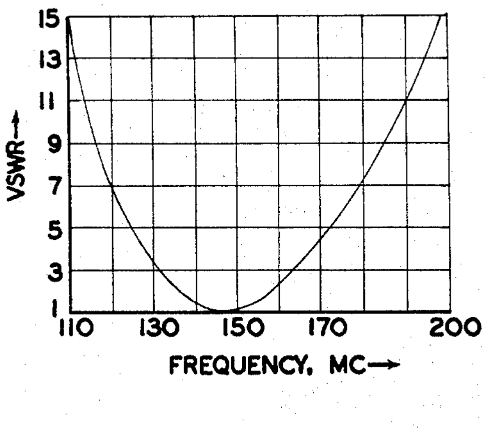
Figure 4:
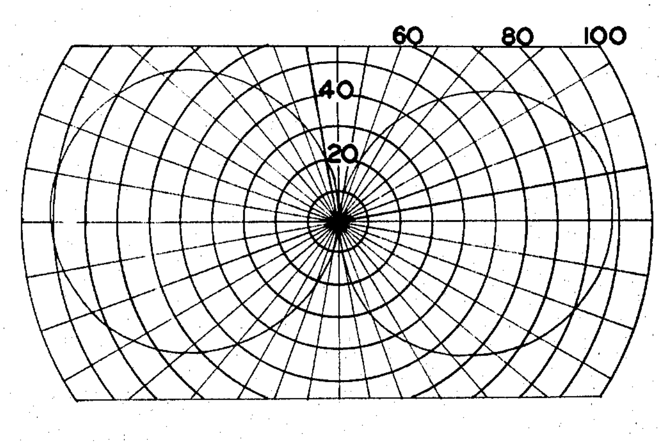
FIGURE 4 illustrates the frequency response of the transistorized dipole antenna-amplifier; and, FIGURE 5 illustrates the VSWR of reference dipole antenna.
Figure 4:
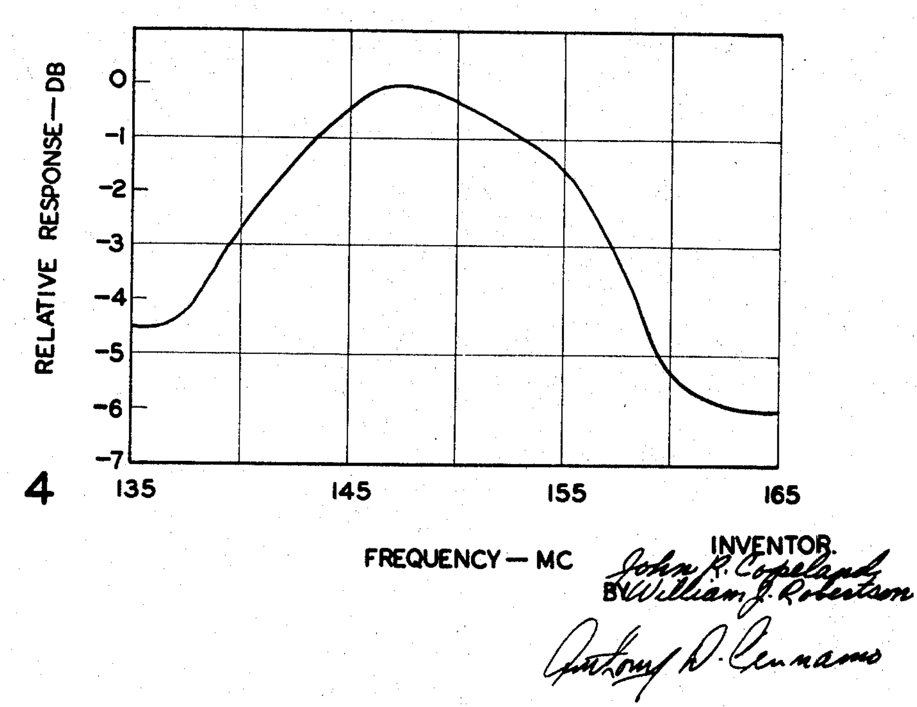

FIGURE 4 shows the frequency response of the antenna-amplifier. This curve was obtained from comparison with the response of a reference dipole constructed to the same dimension as the antenna-amplifier, with an identical reference dipole used as the transmitting antenna. FIGURE 5 shows a VSWR curve of the two identical reference dipoles. In this way the frequency behavior of the transmitting antenna was known and accounted for in the frequency-response measurements.

As mentioned earlier, since the half-power band-width of the antenna-amplifier corresponds to VSWR limits of less than 2 on the antenna (a VSWR of 5.8 would correspond to a half-power mismatch), the bandwidth of the antenna-amplifier is determined principally by the choice of loaded Q in the collector circuit.

The spot noise temperature measured at 146 mc. indicated about 350° K. for the complete antenna-amplifier. This turns out to be slightly better than the approximately 425° K. measured for the same transistor in the amplifier test circuit. This difference is believed to arise from the losses which inevitably occur in the input circuit of the amplifier, and which have been eliminated in the integrated design.

What is claimed is:

1. An integrated antenna circuit comprising an antenna, a feed section for said antenna having one end coupled directly to said antenna, an amplifier circuit positoned with respect to said antenna at the point of signal origin, said amplifier comprising a transistor circuit including a base, an emitter, and an input-output circuit therefor, means for coupling the other end of said feed section directly to said base, and means for connecting said input-output circuit to said emitter.

2. An integrated antenna circuit comprising an antenna, a gamma-match feed section for said antenna, said feed section further including a rod like element having one end coupled directly to said antenna, an amplifier circuit positioned with respect to said antenna at the point of signal origin, means for connecting the other end of said rod element feed section to said amplifier, an output circuit for said amplifier including an impedance match section, and means for coupling energy as said output circuit.

3. An integrated antenna circuit as set forth in claim 2 wherein said antenna further comprises a half-wavelength dipole.

4. An integrated antenna circuit comprising an antenna, a gamma-match feed section for said antenna, said feed section further including a rod shaped element having one end coupled directly to said antenna, an amplifier circuit positioned with respect to said antenna at the point of signal origin, an impedance matching circuit connecting the other end of said rod element to said amplifier, an output circuit including an impedance match circuit for said amplifier, and means for coupling energy at said output circuit.

5. An integrated antenna circuit as set forth in claim 4 wherein said rod element has a variable length and said impedance matching circuit connected thereto includes a variable capacitance, said variable length rod and said variable capacitance adjustable for matching the impedance of said antenna to said amplifier.

6. An integrated antenna circuit as set forth in claim 4 wherein said output circuit further comprises a resonant tank circuit including an inductance and the parasitic output capacitance of said amplifier to thereby achieve maximum bandwidth.

7. An integrated antenna circuit as set forth in claim 4 wherein said output circuit further comprises a resonant tank circuit including an inductance and the parasitic output capacitance of said amplifier, a tap on said inductance, and means for coupling energy at said tap.

8. An integrated antenna as set forth in claim 3 further including structural means for supporting said antenna, and means for preventing antenna currents from flowing on said structural means.

9. An integrated antenna circuit comprising an antenna, a feed section for said antenna having one end thereof coupled directly to said antenna, an amplifier circuit positioned with respect to said antenna at the point of signal origin, said amplifier having a transistor circuit including a base, emitter, and an input-output circuit therefor, means for coupling the other end of said feed section directly to said base, bias means connected to said emitter; said input-output circuit including an inductance and a capacitance connected to said emitter of said transistor, a tap on said inductance, and means for coupling energy to said tap.

10. An integrated antenna circuit as set forth in claim 9 wherein said bias means includes variable means for varying the gain of said amplifier.

11. An integrated antenna circuit as set forth in claim 9 wherein said capacitance in said input-output circuit comprises the parasitic capacitance of said transistor.

12. An integrated antenna circuit as set forth in claim 9 wherein said feed section is a gamma-match feed including a rod like element, and means for varying the length of said feed for matching the impedance of said antenna to said amplifier.

No references cited.

KATHLEEN H. CLAFFY, *Primary Examiner.*

R. S. BELL, *Assistant Examiner.*